J. H. JOHNSON.
BALL COCK.
APPLICATION FILED APR. 12, 1913.
1,140,377.
Patented May 25, 1915.
Fig. 1.
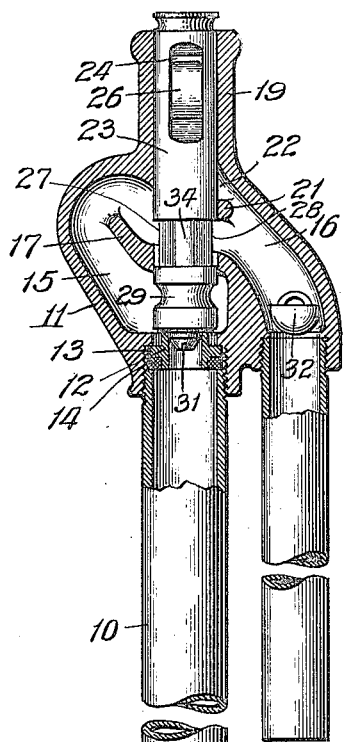
Fig. 2.
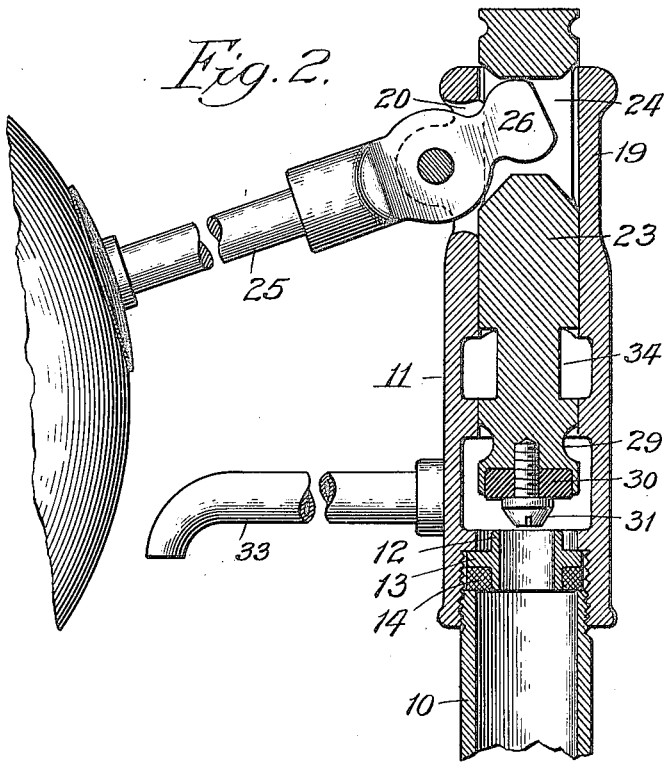
Fig. 3.
Fig. 4.
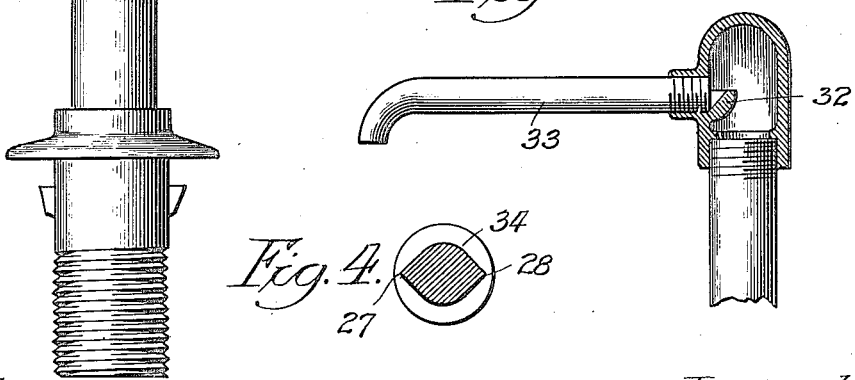
Witnesses:
John Enders
Gustav Drews
Inventor:
John H. Johnson,
by Wallace R. Lane.
Atty.

UNITED STATES PATENT OFFICE.

JOHN H. JOHNSON, OF CHICAGO, ILLINOIS, ASSIGNOR TO FEDERAL-HUBER COMPANY, OF CHICAGO, ILLINOIS, A CORPORATION OF ILLINOIS.

BALL-COCK.

1,140,377.

Specification of Letters Patent. Patented May 25, 1915.

Application filed April 12, 1913. Serial No. 760,627.

*To all whom it may concern:*

Be it known that I, JOHN H. JOHNSON, a citizen of the United States, residing at Chicago, in the county of Cook and State of Illinois, have invented new and useful Improvements in Ball-Cocks, of which the following is a specification.

This invention relates to ball cocks and especially to those in which the ball lever directly engages the valve stem.

The main objects of the invention are to provide a ball cock in which the valve controlling mechanism can be easily and quickly removed for repair or the like without removing the valve casing; also to provide water passages in the valve casing so arranged that the upper end of the valve stem which engages the ball lever will be protected from water pressure and thereby packing and the like be dispensed with.

It is a further object of the invention to provide the valve cock with an outlet of large dimensions, fitting the valve chamber with an inwardly projecting ledge or cup to divert some of the passing water outward for reëstablishing the water seal in the bowl of the closet whereon this valve cock is in use.

The above and other features, capabilities and advantages of the invention will become apparent from a detailed description of the drawings in which—

Figure 1 is an elevation showing the ball cock attached to a supply pipe in which the ball cock is partly in section. Fig. 2 is an enlarged transverse section of the same. Fig. 3 is a transverse section of a by-pass which leads from the outlet pipe; and Fig. 4 is a cross-section of a portion of the valve stem.

In the construction shown at the upper end of an inlet or supply pipe 10 is attached the valve casing 11. Between the inlet pipe 10 and the valve casing 11 is provided a valve seat 12 which is of cylindrical shape having an annular rim 13. Around the lower end of this valve seat a washer or gasket 14 of rubber or any other suitable packing material may be provided. One face of this washer 14 is adapted to lie against the rim 13 and the other face against the upper edge of the inlet pipe 10. As shown this valve seat is reversible so that if one side becomes worn, it is only necessary to provide a washer around the other end of the valve seat 12 and reverse the same.

The valve casing has an inlet water passage 15 which extends in an upward direction and an outlet water passage 16 which extends in a downward direction. In the valve casing, a baffle 17 is provided to separate the inlet from the outlet openings of the passages and extends upward a certain distance permitting an opening above its upper end through which the water passes from the inlet passage 15 to the outlet passage 16. At the upper end of the valve casing 11 is provided a diminished cylindrical extension 19. In one side of this extension 19 is provided an opening 20 (Fig. 2). Below the cylindrical extension 19 is provided a second baffle 21 which starts at the upper end of the valve casing immediately above the upper end of the baffle 17 and extends downward and to one side of the channel 16. This baffle 21 extends sufficiently beyond the chamber 22 in the extension 19 so that water rushing from inlet passage 15 into outlet passage 16 will be efficiently deflected to pass the baffle 21 without exercising any pressure in the chamber 22.

A valve stem 23 is provided which, when assembling, is adapted to pass through the chamber 22 of the extension 19, and then through openings provided in the baffles 21 and 17 to the valve seat. At the upper end of the valve stem 23 is provided a slot 24. A ball lever 25 is fulcrumed at a point outside of the opening 20 and has an extension 26 extending into the slot 24 to operate the valve stem 23. This forms one of the features of the invention in that when it is desired to remove the valve mechanism for repair or any other reason, the valve casing need not be disassembled or removed, it being simply necessary to withdraw the fulcrum pin or screw which connects the ball lever with the valve casing, and then to remove the entire valve stem out through the cylindrical extension 19.

The valve stem 23 is of novel conformation. A portion 34 of the valve stem is recessed. When the valve stem is in its raised position, this recessed portion is adapted to be positioned in the outlet passage 16. This portion 34 of the valve stem has a substantially semi-annular recess on each side of the valve stem, the inner walls of the ends of the semi-annular recesses projecting outward to form pointed edges 27 and 28 opposite one another as shown in cross-section in Fig. 4. These edges are on each side of the valve stem so that the valve stem may be reversed. The reason for these edges obviously, is so that the water may freely pass the valve stem with little impediment. But below the recessed portion 26 the valve stem is again of the larger diameter to fit snugly into the opening of the fin 17 to prevent water from the outlet passage to back into the inlet passage. The portion of the valve stem operating in the inlet passage 15 has an annular groove 29 to afford the largest water passage possible. At the lower end of the valve stem is secured a washer of rubber or other suitable packing material to securely engage the valve seat 12. In the present instance, the lower end of the valve stem is cup-shaped to receive a washer 30. This washer is held in place by means of a screw 31.

The operation of the ball cock is as follows: When the ball descends, its lever 25 will raise the valve stem to the position shown in Fig. 2. In this raised position the recessed portion 34 of the valve stem will be positioned in the passage 16, thus when the water rushes in through inlet passage 15 and around the upper end of the baffle 17, it will rush past the recessed portion 34, out through outlet passage 16. By means of the baffle 21, the water will be deflected downward and thus no water pressure will be exercised upward into chamber 22 and therefore no packing or the like is required. It will also be noted that the diameter of valve seat 12 is considerably less than the diameter of the water passages 15 and 16, and therefore the water passing into a passage of larger diameter will shoot through with considerable force thus to prohibit a stagnation of water in the outlet passage which might otherwise pile up and back into the chamber 15.

Within the valve casing and directly in the path of water passing through the outlet passage is a projecting cup or deflector 32 hollowed out to divert some of the passing water outward to a side spout 33 which has a down turned end for delivering the water thus diverted through the flushing valve of the water closet into the bowl where it replenishes the water seal after each flushing of the bowl.

While there is herein shown and described only one embodiment of the invention it is to be understood that various changes and modifications may be made by those skilled in the art without departing from the scope of the invention as defined in the appending claims.

Having thus described my invention, what I claim and desire to secure by Letters Patent is:

1. In a ball cock, a casing having a cylindrical bore at its upper end, transverse baffles in said casing forming a water channel having a reverse bend, said baffles having openings in alinement with said bore, a valve at the lower end of said casing, said valve having a valve stem adapted to be introduced and removed from said casing through said alined openings, the portion of said valve stem positioned in the water channel when the valve is open being recessed, said recessed portion terminating in edges at the diametrically opposite sides of the stem which when in position for operation will present an edge to the direction of flow so that the water will freely pass with little impediment.

2. In a ball cock, a casing having a cylindrical bore at its upper end, transverse baffles in said casing forming a water channel having a reverse bend, said baffles having openings in alinement with said bore, a valve at the lower end of said casing, said valve having a valve stem adapted to be introduced and removed from said casing through said alined openings, one of said baffles being positioned below the cylindrical bore which serves to deflect the water from said bore thereby to dispense with packing at such place.

3. In apparatus of the class described, a casing, a valve in said casing comprising a cylindrical stem having a cut away portion to provide a water passage, baffles in said casing through which said cylindrical stem is slidably mounted, all so constructed and arranged that the valve may be removed longitudinally from the casing as one piece.

4. In apparatus of the class described, a casing having an inlet and an outlet, a goose-neck passage between the inlet and the outlet, an extension on the casing in line with the inlet, a cylindrical valve stem slidably mounted in said extension and passing through said goose-neck passage, said valve stem having cut away portions to coöperate with said goose-neck passage, all for the purpose described.

5. In apparatus of the class described, a casing having an inlet and an outlet, and reverse bend therein, an extension in said casing in line with the inlet, a cylindrical aperture communicating from said inlet to the end of said extension, a cylindrical valve stem slidably mounted in said aperture and having a cut away portion forming a water passage, substantially as described.

In witness whereof, I hereunto subscribe my name to this specification in the presence of two witnesses.

JOHN H. JOHNSON.

Witnesses:
F. C. PERKINS,
C. S. BADGER.